Patented Aug. 9, 1932

1,870,886

UNITED STATES PATENT OFFICE

ARTHUR E. BARNARD, OF NORRISTOWN, PENNSYLVANIA, ASSIGNOR TO DISPERSIONS PROCESS, INC., OF DOVER, DELAWARE, A CORPORATION OF DELAWARE

PROCESS OF RECLAIMING VULCANIZED RUBBER AND PRODUCT OF SAME

No Drawing.   Application filed April 13, 1929.  Serial No. 354,991.

This invention relates to a process of reclaiming vulcanized rubber, and the product resulting from the process, being more particularly designed to yield reclaimed rubbers which, although not limited thereto, are especially suitable for use as electric insulators, e. g., for the insulation of electric wires or cables, and for general use in the electrical art.

Among the various desiderata required in reclaimed rubbers for use as electric insulators, is freedom from impurities such as metals, grit, wood, and the like, and bodies which impart high water absorption thereto or impair di-electric strength, such as salts, bases, acids, or other electrolytes. Not only does a stock prepared in accordance with the process of this invention possess the proper working properties so as to tube readily, but it may be used where exposed to moist or wet conditions, as it possesses high di-electric qualities owing to its low water absorption and freedom from impurities.

In the manufacture of reclaimed rubbers by the usual processes, e. g., the so-called alkali process or the so-called acid process, it is difficult to produce a product suitable for use as an electric insulator without resorting to expensive conditioning treatment. Thus, in the alkali process, not only does the resulting reclaimed or plastic rubber contain electrolyte in the form of sodium hydroxide, put also in the form of salts such as carbonates, alkali-celluloses, and the like. So, too, in the so-called acid process, not only does the rubber absorb the acid used to destroy the fibrous material but doubtless, also, acid reaction products, including salts. In order to remove the undesirable impurities present in such reclaimed rubbers and to condition them for use as electric insulators, it has sometimes been the practice to subject them to washing on mills, but this operation, in addition to being expensive, is a makeshift cure, as some of these impurities persist in the washed product.

In accordance with the process of the present invention, vulcanized rubber is plasticized or reclaimed, whereupon the plastic mass is then dispersed in water by the use of a suitable dispersing agent. Water-soluble impurities such as those which adversely affect the di-electric properties of the rubber are thereby released, going into solution in the aqueous medium. The dispersed rubber particles are then separated from the aqueous medium as by the addition of a suitable agent which forms a coagulum or a flocculent rubber precipitate, which may be removed from the aqueous medium as by screening. The type of agent used for this purpose may vary, depending upon the characteristics of the agent used in dispersing the rubber, the properties desired in the finished reclaim, and the mode of separation desired from the water. For example, when using a soap such as sodium resinate as the dispersing agent, acetic acid or aluminum sulphate may be used, depending upon the condition in which it is desired to separate the rubber from the aqueous medium. The use of acetic acid results in the coagulation of the rubber in the form of a coherent mass which may be separated from the aqueous medium and subjected to washing for the removal of last traces of water-soluble constituents. When a metallic salt of the type of aluminum sulphate is used, the dispersed rubber may be converted into a flocculent precipitate which may be removed from the aqueous medium as by delivering over screens of a mesh designed to retain substantially all the precipitated material, but allowing the aqueous medium to pass through, whereupon the precipitate may be washed free of water-soluble residues.

The process of the present invention may be applied when using various types of scrap or waste rubbers or rubber-fiber stocks as a raw material. For instance, the raw material may be boots and shoes, hose, belting, rubberized fabrics, inner tubes, solid or pneumatic tires. When the scrap is one which is associated with a comparatively large amount of fibrous material, it may be processed as by the so-called alkali or acid process, so as to effect a destruction of such fibrous material. If desired, the fiber and rubber may be roughly separated as by passing pieces through an attrition or grinding mill, and then through a separator, e. g., an air separator, which effects a separation of the loosened fibrous material from the bulk of the rubber. The rubber portion may then be plasticized or reclaimed, as usual. In some cases, however, it may be preferably to carry out plasticization without introducing water-soluble or electrolytic materials into the plastic product. This may be accomplished by subjecting the ground rubber to the action of water alone, at elevated temperature and under pressure, the conditions being such as will cause the desired degree of plasticization in the product. If desired, softening agents, preferably of a character which do not absorb water and do not react to form objectionable water-soluble compounds which may remain in the stock after the process is completed, may be added to the water in which the high temperature and pressure digestion is effected. The softening agent used for this purpose may be unsaponifiable, such as coal tar oil, but saponifiable softening agents may be used and indeed in some cases are preferable, inasmuch as they may initially serve as plasticizing agents and then be saponified by the addition of alkali to produce soap in situ in the rubber, which may serve as the dispersing agent. Various saponifiable softening agents may be used,—rosin oil, rosin, pine tar, oleic acid, and fatty acids in general being illustrative of the class which are eminently suitable as they may be readily converted in situ in the rubber into soaps by the addition of alkali at room or somewhat elevated temperatures. When dispersion of the plastic rubber mass is effected in internal mixers, such as a Werner and Pfleiderer, Ross, Day, or Banbury, a saponifiable softening agent may be uniformly distributed throughout the mass so that saponification may be readily and uniformly effected at comparatively low temperatures, even in the case of solid softening agents such as rosin, which ordinarily require heating over an extended period of time to undergo complete saponification.

The process of the present invention may best be appreciated by citing certain examples of procedure such as the following. Scrap pneumatic tires were first chopped into pieces of convenient size, whereupon the pieces were passed through an attrition mill and then through an air separator to effect a rough separation of rubber and fibrous material. The rubber portion (containing about 5% fiber) was then subjected to a plasticizing treatment. To this end 3300 parts by weight of the ground rubber and 165 parts of coal tar distillate were placed in a digester along with 8250 parts of water. The addition of the distillate is preferably made to the dry ground scrap so as to secure intimate admixture of these materials. The digester was then closed and subjected to heating, as by a steam jacket, until a temperature of about 380 degrees F. and a pressure of about 200 pounds per square inch were developed therein, heating being continued under these conditions for about eight hours, at the end of which time a stock of the desired plasticity was obtained. The stock was then washed free of spent liquor and dried to a water content of about 0.8%, at which stage it was in condition to undergo dispersion. Fifteen hundred parts by weight of such dried stock were then placed in a jacketed Banbury mixer, steam being passed through the jacket and the mixer being set in operation until the rubber cohered or "made" into a pulling mass. Five per cent by weight of rosin (based on dry stock) was then added to the charge, mixing being continued until the rosin was uniformly disseminated throughout the charge, whereupon 1½% by weight of caustic soda was added in dry, ground condition. As soon as the caustic soda was uniformly distributed throughout the mass, water was added gradually and in uniform quantities until the mass finally dispersed as minute particles in the aqueous medium. The resulting dispersion was of a heavy, rubber-cement-like consistency, and contained about 15% water when the change of phase took place. Inasmuch as this dispersion contained the fiber associated with the ground rubber used as a starting material, together with other coarse solid impurities, it was desirable to remove these impurities from the dispersion. This was accomplished by diluting the dispersion with water to a solids content of about 35%, at which time the dispersion was of flowable consistency, and was delivered over screens of a fineness of about 80 mesh, which retained fibrous material and other coarse solid impurities, while permitting the dispersed rubber and the aqueous medium to pass through.

The screened dispersion was now treated for the recovery of rubber. In one case, 3,554 parts of the screened dispersion were added slowly to 10,160 parts of water containing 26.9 parts of acetic acid and under vigorous agitation. This resulted in the coagulation of the dispersed rubber as a coherent mass or lump, and the production of a serum neutral to litmus. The coagulum was removed from the serum and passed through a washing mill to remove residual serum, whereupon the washed mass was sheeted thin and dried. The finished product, when cured and then tested for water absorption, took up only about .451% water after twenty-four hours, this indicating a good product for use as an electric insulator.

In another case, 3,702 parts of the 35% dispersion were added slowly to 10,582 parts of water containing 52 parts of $Al_2(SO_4)_3 \cdot 18 H_2O$. The dispersed rubber separated out in floccs which settled quickly leaving a clear layer of supernatant water. The flocculated mass was then passed through 80-mesh screens, the water passing quickly through the layer of flocculated rubber accumulating on the screens, whereupon the layer of flocculated rubber was washed on the screens, with fresh water until the wash water was free from sulphates. If these steps are properly performed, the rubber floccs, if maintained in moist condition without the application of substantial pressures, will remain as such, that is, they will not aggregate or coalesce, so that they may be easily washed and dried. The water passing through the 80-mesh screen may be again passed through a finer mesh screen, say a 200-mesh screen, or, if desired, the water may be passed through a Door clarifier to ensure the recovery of substantially all of the rubber. Under proper conditions, however, substantially all of the rubber may be recovered on an 80-mesh screen, as the rubber floccs are comparatively large. The flocculated rubber is in condition permitting of drying on traveling screens, as in ordinary practice, thus presenting an advantage over the acetic acid method, which necessitates drying to be practised on sheet material from which it is more difficult to drive off water. The product, when sheeted, cured and tested, resulted in the absorption of only .34% water after twenty-four hours, this indicating even a better product for insulation purposes than that obtained by the acetic acid method.

In recovering the rubber from the dispersion by the use of acetic acid, when soaps are used as the dispersing agents, as in the example given, the acetic acid reacts upon the soap to form sodium acetate, which is water-soluble, and to liberate free fatty acid in the stock (in the example given, abietic acid). It is thus seen that by choosing an appropriate soap as a dispersing agent, the process may be regulated so as to result in a finished product containing a desired fatty acid which is insoluble in water. When aluminum sulphate is used so as to effect flocculation of the dispersed rubber, the reaction upon the rosin soap and free alkali is one which results in the production of a soluble sulphate, namely, sodium sulphate, and aluminum hydroxide and aluminum resinate. The aluminum hydroxide and aluminum resinate, being water-insoluble, remain associated with the resulting product, but the sodium sulphate, which is water-soluble, is removed along with the aqueous serum. The process in this latter case may also be carried out so as to result in a final product containing a desired insoluble aluminum-fatty-acid compound along with the aluminum hydroxide, which serves as a filling or compounding material. The amount of aluminum hydroxide present in the finished product may be reduced by the use of less caustic soda in the dispersing step, or by using a prepared soap in place of forming a soap from its components in situ in the mixer.

When the cellulose present in scrap rubber has not been degraded through the action of alkalies during devulcanization or plasticization, with the resulting formation of soluble and colloidally soluble cellulose products, such as alkali-, oxy, hydrated-cellulose, and does not contain adsorbed alkali, the flocculent material precipitated from a dispersion of the plastic or reclaimed scrap by aluminum sulphate is of sufficiently large particle size to permit of rapid separation by passing over an 80-mesh screen, and is in an excellent condition for drying. Degraded cellulosic material as well as excessive amounts of gelatinous aluminum hydroxide which retard screening are practically avoided under the conditions of the process in the foregoing example.

If no alkali is used in the plasticizing or devulcanizing operation, as in the foregoing example, a coagulum or coherent mass may be obtained through the use of salts of the divalent metals, such as zinc sulphate, magnesium sulphate, zinc chloride, magnesium chloride, barium chloride, calcium chloride, etc. The coagulum may be removed from the serum and passed through a washing mill, ball mill, or washer of the internal-mixer type, to remove the residual serum. Barium chloride may be used advantageously when the presence of a metallic hydroxide is to be avoided in the rubber, since barium hydroxide, being more soluble in water than metallic hydroxides resulting from other metallic salts suitable for use as coagulating agents may be readily removed by washing.

The action of metallic salts may be different upon dispersions of rubber reclaimed by the so-called alkali process. For example, the precipitation of such dispersions with aluminum sulphate or zinc sulphate, although practically complete, may result in such fine particles that a considerable amount may pass through a screen of, say, 200 mesh, and screening may be retarded by the presence of excessive amounts of metallic hydroxides such as aluminum hydroxide. Mineral acids, such as sulphuric or hydrochloric, may be used to agglutinate this finely precipitated material into floccs sufficiently large to be retained by screens with larger openings, say, 80 mesh. The amount of mineral acid required may be twice that theoretically required to combine with the sodium content of the dispersed reclaimed rubber. Barium chloride and calcium chloride may give flocculent precipitates of sufficient size to be retained by screens approximating 80 mesh. Magnesium sulphate may coagulate the rubber in the form of a coherent mass, as does acetic acid. It is thus seen that the choice of metallic salt used to precipitate the dispersed reclaimed rubbers may be varied according to the conditions of devulcanization, plasticization, and the mode of separation desired from the serum and serum substances.

The examples hereinbefore given are subject to various changes. For example, the dispersed rubber may be recovered in flocculent condition, substantially free from water-soluble or water absorbing constituents, by delivering it into a body of water of sufficient size to result in the washing of the dispersing agent from the particles and their agglomeration into floccs which may be separated by screening from the aqueous medium in which the dispersing agent is present in exceedingly dilute condition. Where this method is employed, a good deal of rubber remains suspended in fine particle size in the diluting water, so that the recovery of the rubber floccs by screening results in comparatively low yields. Accordingly, it is desirable to treat the diluting water for the recovery of the rubber constituent present therein. This may be accomplished by acidifying it with acetic acid to produce a rubber coagulum as previously described, or by the addition of a suitable salt such as aluminum sulphate, or by using it as a diluting medium for subsequent dispersions. In coagulating the rubber, acids other than acetic, such as sulphuric, hydrochloric, or acid salts, may be used, acetic acid being preferable owing to its milder action on rubber if residual traces are allowed to remain in the product. In some instances, it has been found preferable to mix the aqueous rubber dispersion and a solution of the precipitating agent, i. e., acids or metallic salts, by delivering them simultaneously into a tank from orifices of suitable dimension to maintain the desired ratio of dispersion solids to precipitating solution.

It may be unnecessary to remove all of the water-soluble products from the rubber in instances where the presence of some water-soluble material is not objectionable. Dilution of the aqueous rubber dispersion with water to the proper degree will result in a washing of a major portion of the water-soluble constituents from the dispersed rubber particles, and the flocculation of the particles, so that the rubber in the form of floccs associated with a minor portion of the water-soluble constituents may be recovered from the aqueous medium, as hereinbefore described. Or the aqueous rubber dispersion, as such, may initially be passed through screens of the desired fineness to remove solid impurities, whereupon a suitable flocculating agent, such as aluminum sulphate, may be added thereto to cause flocculation of the rubber. The rubber floccs may be separated from the aqueous medium and easily dried, resulting in a finished high grade stock of unusually high cleanliness.

The process of the present invention, and various commercial applications thereof, having thus been described, it should be evident to those skilled in the art that various changes or modifications might be resorted to without departing from the spirit or scope of invention as set forth in the subjoined claims.

I claim:

1. A method which comprises plasticizing vulcanized rubber, dispersing the plastic mass in water in the presence of a dispersing agent, adding the aqueous dispersion to a relatively large body of water to flocculate the rubber, removing the rubber floccs from the aqueous medium, washing the floccs, and drying.

2. A method which comprises plasticizing vulcanized rubber, dispersing the plastic mass in water in the presence of a dispersing agent, adding the aqueous dispersion to a relatively large body of water containing a metallic salt to flocculate the rubber, removing the rubber floccs from the aqueous medium, washing the floccs, and drying.

3. A method which comprises plasticizing vulcanized rubber, dispersing the plastic mass in water in the presence of a dispersing agent, adding the aqueous dispersion to a relatively large body of water containing aluminum sulphate to flocculate the rubber, removing the rubber floccs from the aqueous medium, washing the floccs, and drying.

4. A method which comprises plasticizing vulcanized rubber, dispersing the plastic mass in water in the presence of a dispersing agent, adding the aqueous dispersion to a relatively large body of water to flocculate the rubber, removing the rubber floccs from the aqueous medium, and drying.

5. A method which comprises plasticizing vulcanized rubber, dispersing the plastic mass in water in the presence of a dispersing agent, adding the aqueous dispersion to a relatively large body of water containing a metallic salt to flocculate the rubber, removing the rubber floccs from the aqueous medium, and drying.

6. A method which comprises plasticizing vulcanized rubber, dispersing the plastic mass in water in the presence of a dispersing agent, adding the aqueous dispersion to a relatively large body of water containing aluminum sulphate to flocculate the rubber, removing the rubber floccs from the aqueous medium, and drying.

7. A method which comprises plasticizing vulcanized rubber at elevated temperature in water containing a minimum of softening agent, dispersing the plastic mass in water in the presence of a minimum of dispersing agent, adding the aqueous dispersion to a relatively large body of water to flocculate the rubber, removing the rubber floccs from the aqueous medium, and drying.

8. A method which comprises plasticizing vulcanized rubber at elevated temperature in water containing a minimum of oil as a softening agent, dispersing the plastic mass in water in the presence of a minimum of dispersing agent, adding the aqueous dispersion to a relatively large body of water to flocculate the rubber, removing the rubber floccs from the aqueous medium, and drying.

9. A method which comprises plasticizing vulcanized rubber at elevated temperature in water containing a minimum of saponifiable softening agent, dispersing the plastic mass in water in the presence of approximately only sufficient alkali to saponify the said softening agent, adding the aqueous dispersion to a relatively large body of water to flocculate the rubber, removing the rubber floccs from the aqueous medium, and drying.

In testimony whereof I have affixed my signature.

ARTHUR E. BARNARD.